June 19, 1923.  
S. M. VIALE  
ENGINE CYLINDER  
Filed Aug. 11, 1921  
1,459,039
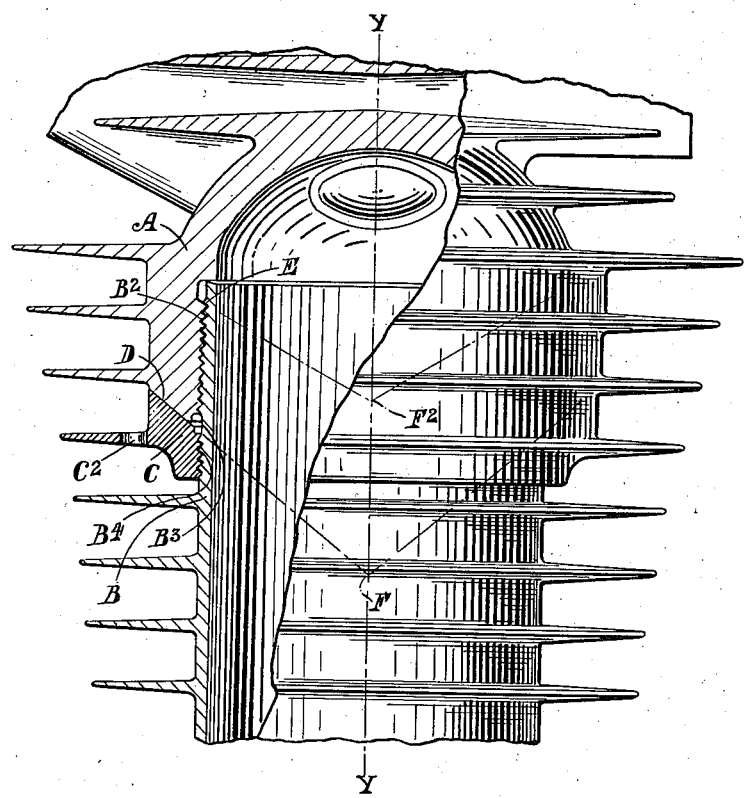
INVENTOR
Spirito Mario Viale
PER
ATTORNEY Patented June 19, 1923.

1,459,039

UNITED STATES PATENT OFFICE.

SPIRITO MARIO VIALE, OF COVENTRY, ENGLAND, ASSIGNOR TO ARMSTRONG SIDDELEY MOTORS LIMITED, OF COVENTRY, ENGLAND.

ENGINE CYLINDER.

Application filed August 11, 1921. Serial No. 491,331.

*To all whom it may concern:*

Be it known that I, SPIRITO MARIO VIALE, a subject of the King of Italy, residing at Coventry, in the county of Warwick, England, have invented certain new and useful Improvements in Engine Cylinders, of which the following is a specification.

This invention relates to air cooled cylinders for internal combustion engines, of the kind in which the cylinder head is separate from the barrel and is screwed upon the outside of the upper end thereof. Usually the head is of aluminium, or other similar non-ferrous alloy, and the barrel is of steel, and the joint is liable to loosen owing to the different co-efficients of expansion of the two metals. It is the object of this invention to prevent this in a simple manner.

According to this invention, a locking ring is employed to lock the barrel and the head together and this locking ring may be mounted upon the barrel and engaged with the thread thereon, and is then screwed up against the inner end of the head after the latter is screwed home on the barrel. The abutting faces of the ring and lower end of the head are coned, the apex of the cone being downwards, that is, it points away from the head, the object being to cause the joint to tend to tighten up as expansion takes place when the cylinder heats up.

The preferred manner of carrying out the invention is illustrated in the accompanying drawing shewing a section of part of a cylinder with the head and locking ring in position.

The head A is of aluminium alloy, and may carry the valves (not shewn) in any suitable known manner. This head screws upon the end of the steel cylinder barrel B, and the external thread provided thereon for this purpose at $B^2$ may be of the buttress or any other suitable form, but preferably is of the V type shewn.

At $B^3$ there may be a gap in the thread, and upon the portion below the gap indicated at $B^4$ screws the locking ring C, which is preferably of steel. Where this ring is adapted to abut the cylinder head, its contacting face is coned as shewn at D, the direction of inclination being such that the apex of the cone of which it forms a part points away from the cylinder head, that is, away from the combustion chamber. The abutting face on the head A is also coned to correspond with that on the locking ring.

The ring C is first screwed down upon the thread $B^4$ and the head A is then fitted in place upon the thread $B^2$. In some cases the head may be heated before fitting to the barrel, but in any case the parts should be cold before the ring C is screwed up. When this is done, the ring locks the head in place and makes a pressure tight joint.

The relative location of the cones formed respectively by extension of the contacting sides of the thread E remote from the locking ring and constituting the last of the engaged threads $B^2$ connecting the head and the cylinder, and by extension of the coned contact surfaces at D of the locking ring and the head is such that the apex $F^2$ of the former is nearer to the combustion chamber (that is, the head) than the apex F of the latter cone, both cones, as shewn, having their apices pointing in the same direction.

By reason of this arrangement, as the wall of the head expands under heat, it tends to increase the pressure between the ring and head and to tighten the joint still further.

Preferably the ring C is wide so as to form a cooling flange and has holes $C^2$ to receive a spanner or the like.

Thus a tight mechanical joint is obtained at all times.

What I claim as my invention and desire to secure by Letters Patent of the United States is:—

1. In an engine cylinder, the combination with the barrel having screw threads thereon, and a head screwed upon said barrel, of a locking ring screwed upon the said barrel and bearing against the inner end of the said head so as to exert a thrust thereon on expansion.

2. In an engine cylinder, the combination of a barrel member, a head member screwed upon said barrel member, a locking ring having a screw-threaded engagement with one of the aforesaid members, thereby to exert a thrust upon the other member, and a coned face formed on said locking ring to engage a co-operating coned face formed on the member against which it thrusts.

3. In a cylinder as claimed in claim 2, forming the coned contacting faces of the locking ring and of the member against which it thrusts, at such an angle that the apex of the cone formed by their extension is further from the cylinder head than the apex of the cone formed by extension of the contacting sides of the engaged screw thread most remote from them in the screw-threaded connection of the head with the barrel, the apices of both cones pointing in the same direction.

In testimony whereof I have signed my name to this specification in the presence of two subscribing witnesses.

SPIRITO MARIO VIALE.

Witnesses:
D. SINARCEY,
E. M. NICHOLSON,